United States Patent
Raghavan et al.

(10) Patent No.: US 12,488,304 B1
(45) Date of Patent: Dec. 2, 2025

(54) DELIVERY SCHEDULING ADJUSTMENT OF A REPLACEMENT DEVICE BASED ON NETWORK BACKUP OF EXCHANGED DEVICE

(71) Applicant: MOTOROLA MOBILITY LLC, Wilmington, DE (US)

(72) Inventors: Krishnan Raghavan, Bangalore (IN); Vijayprakash Idlur, Bangalore (IN); Prasad A G, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/887,986

(22) Filed: Sep. 17, 2024

(51) Int. Cl.
*G06Q 10/083* (2024.01)
*G06F 11/14* (2006.01)

(52) U.S. Cl.
CPC ....... *G06Q 10/083* (2013.01); *G06F 11/1464* (2013.01)

(58) Field of Classification Search
None
See application file for complete search history.

(56) References Cited

U.S. PATENT DOCUMENTS

| | | | | |
|---|---|---|---|---|
| 2007/0290836 A1* | 12/2007 | Ainsworth | ............. | G06Q 10/08 340/568.1 |
| 2010/0313018 A1* | 12/2010 | Jorgensen | ................ | H04L 9/32 713/168 |
| 2015/0006005 A1* | 1/2015 | Yu | ........................ | G05D 1/667 701/22 |
| 2015/0356637 A1* | 12/2015 | Graffia, II | ............ | G06Q 20/405 705/306 |
| 2020/0202319 A1* | 6/2020 | Forutanpour | .......... | G06Q 20/18 |
| 2025/0061408 A1* | 2/2025 | Majdabadi | ......... | G06Q 10/0833 |

OTHER PUBLICATIONS

Apple Support; "Get temporary iCloud storage when you buy a new iPhone or iPad"; Dec. 17, 2023; https://web.archive.org/web/20231217165532/https://support.apple.com/en-us/104980 (Year: 2023).*

(Continued)

*Primary Examiner* — Shannon S Campbell
*Assistant Examiner* — David G. Godbold
(74) *Attorney, Agent, or Firm* — Isidore PLLC

(57) ABSTRACT

A network device, a method, and a computer program product facilitate delivery scheduling adjustment of a replacement device based on network backup of user data of an exchanged device. In response to detecting completion of a transactional agreement to have the second device delivered to and exchanged for the first device of a user, the network device communicates, via a communications subsystem of the network device, a backup request to the first device for user data that is currently stored on the first device. The network device receives, from the first device in response to the backup request, identification information associated with the first device and metadata associated with the user data to be backed up. The network device triggers delivery of the second device and pickup of the first device at a time corresponding to after completion of the backup of the user data to a network storage.

20 Claims, 9 Drawing Sheets

(56) References Cited

OTHER PUBLICATIONS

Burgess, Brian; "Apple iOS 5: How To Upgrade Your iPhone, iPad or iPod Touch in Windows"; Nov. 2, 2011; https://www.groovypost.com/howto/apple-ios5-upgrade-iphone-ipad-in-windows/ (Year: 2011).*

Apple Community; "iCloud storage full persistent notification"; Sep. 10, 2020; https://discussions.apple.com/thread/251781930?sortBy=rank (Year: 2020).*

Amazon; "Welcome to Amazon Trade-In"; Jan. 4, 2024; https://web.archive.org/web/20240104202101/https://www.amazon.com/I/9187220011 (Year: 2024).*

* cited by examiner

Add buffer time to the adjustment of the delivery schedule to accommodate variations in data throughput during backup of the user data
718

Determine an adjustment of a delivery schedule of the second electronic device based on the backup time, where delivery of the second electronic device occurs only after the backup time elapses from a start-time of the backup of the user data
720

Communicate the adjustment of the delivery schedule to a delivery processing module that controls delivery by a delivery personnel of the second electronic device and pick up of the first electronic device
722

Backup of the user data complete to a network storage?
724
N / Y

Trigger delivery of the second device and pickup of the first electronic device
726

Delivery of the second electronic device less than a threshold time away?
728
N / Y Communicate a prompt to the first electronic device to delete the user data on the first electronic device and to power down the electronic device in preparation for exchange
730

DELIVERY SCHEDULING ADJUSTMENT OF A REPLACEMENT DEVICE BASED ON NETWORK BACKUP OF EXCHANGED DEVICE

BACKGROUND

1. Technical Field

The present disclosure relates generally to electronic devices that include user data, and more particularly to electronic devices that support exchange of data from a first device to a second device.

2. Description of the Related Art

The market for electronic devices through exchange offers (trade-in) is substantial and continuously growing, encompassing a wide range of products, from smartphones and laptops to tablets and gaming consoles. The process typically involves users trading in their old devices when purchasing new ones. The value of the trade-in is typically deducted from the price of the new device or used as an incentive to acquire the new device at a discounted price or for free. Companies can then refurbish and resell the traded-in devices or recycle them, etc. This approach benefits users by making the latest device technology more affordable and encouraging responsible disposal of old devices. The trade-in exchange process also reduces electronic waste and supports sustainability efforts. For businesses, exchange offers boost sales and customer loyalty. They incentivize customers to choose their brand for upgrades, clear existing inventory, and create opportunities for additional revenue through refurbishment and resale. Overall, the exchange offer market provides a win-win scenario for users and businesses alike.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIGS. 7A-7C (collectively "FIG. 7") are a flow diagram presenting a method for facilitating, by a network device, coordinated data backup from a first device with adjusted delivery time of a second device that restores the data, according to one or more embodiments.

DETAILED DESCRIPTION

Figure 1A:
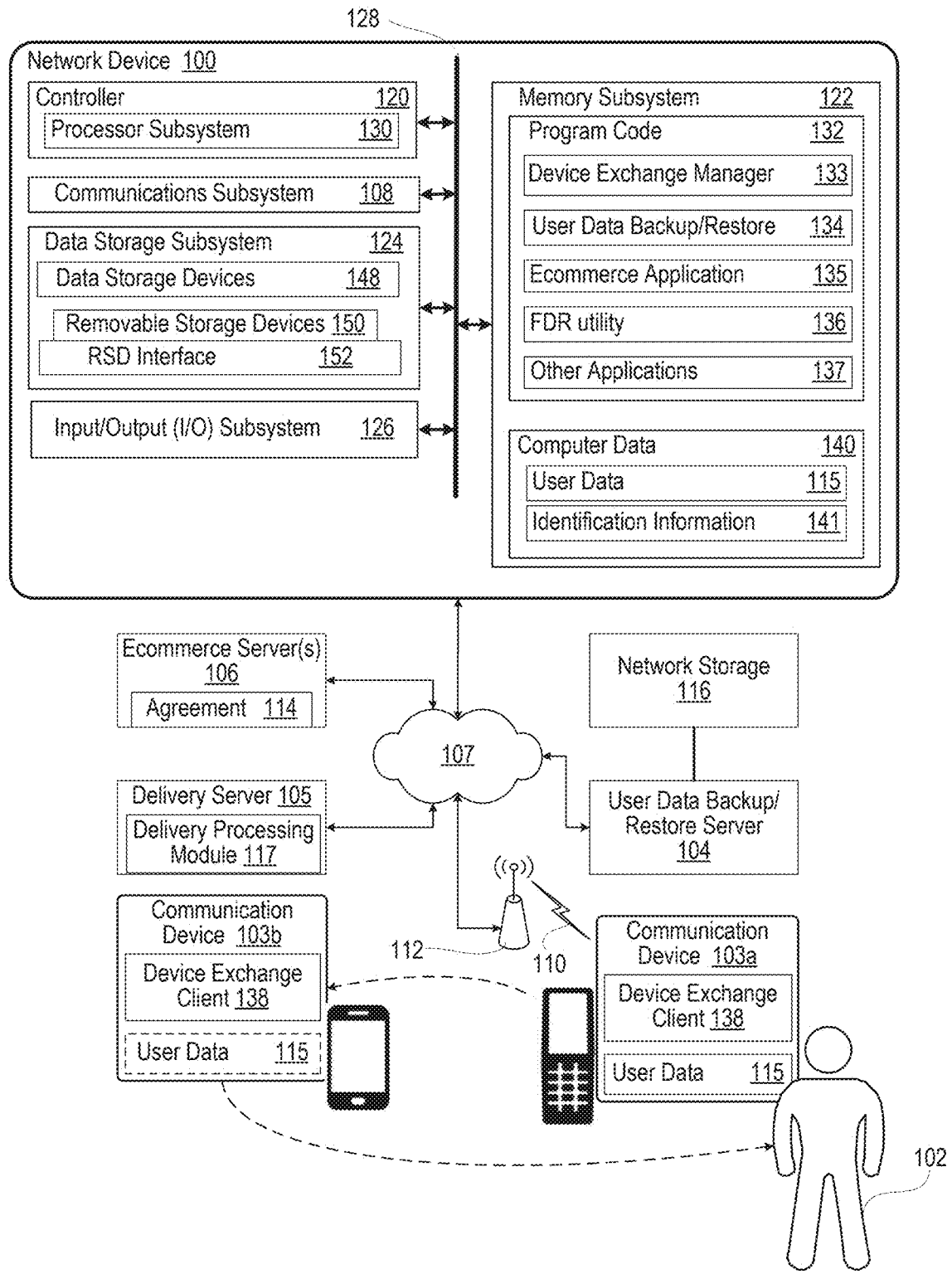
FIG. 1A presents a simplified functional block diagram of a network device in which the features of the present disclosure are advantageously implemented for facilitating coordinated data backup from a first device in time for delivery of a second device that restores the data, according to one or more embodiments.

According to aspects of the present disclosure, a network device, a method and a computer program product facilitate an efficient device-exchange transaction with coordinated data backup from a first device with adjusted delivery time of a second device being exchanged for the first device and to which the data is to be restored. The network device includes a communications subsystem, a memory, and a controller communicatively coupled to the communications subsystem and the memory. In response to detecting completion of a transactional agreement to have a second electronic device delivered in exchange for a first electronic device of a user, the controller is configured to cause the network device to communicate, via the communications subsystem, a backup request to the first electronic device to backup user data that is currently stored on the first electronic device. The controller is configured to cause the network device to receive, from the first electronic device in response to the backup request, identification information associated with the first electronic device and metadata associated with the user data to be backed up. The controller is configured to cause the network device to trigger delivery of the second device and pickup of the first electronic device at a time corresponding to after completion of the backup of the user data to a network storage.

A common challenge in the device exchange process occurs when the new device has arrived, but the user had only one device and no means to back up the first device data to an interim device/location, causing delays during the exchange. In some scenarios, where the user data is deemed important, the failure to back-up the device before arrival of the new/replacement device can lead to the exchange not occurring, as the delivery person cannot wait for the backup to be completed. This situation can also arise when users forget to back up their old device before initiating the exchange or do not want to back up their device too early as they may lose recent data stored after the backup. Some sellers offer a grace period for returning the old device, but this can lead to other problems. Users may miss the deadline, rendering the exchange offer void, or the user's old device might break during the grace period, making it impossible to return properly. This can also result in increased costs for the business as they have to schedule the pickup at a different time from the delivery and/or pre-pay shipping costs. Some of these costs may also be passed on to users. Balancing the need for timely data backup to more closely coordinate with the exchange process timeline remains a significant concern in the exchange offer market, requiring users to plan and manage the transition effectively based on memory and manual tracking.

According to one or more aspects of the present disclosure, facilitating a product exchange with successful prior backup may be realized by combining certain ecommerce features such as coordinated purchase and delivery capabilities with the particular needs of timely backing up user data contained in user devices. Features for carrier support of a mobile communication device, such as data backup and restoration, may be advantageously integrated with features of an ecommerce service to facilitate a product exchange agreement with a minimum amount of time in which the user must be without the phone. In particular, according to aspects of the present disclosure, the network device supports a physical exchange of the old device for the new device, reducing the risk to both the seller and the buyer. In an example, the ecommerce service provides and takes control of the backup/restore process and adjusts the delivery time of the new device to occur soon after completion of the backup of the data from the old device. The solution ensures that the new device is sent for delivery to occur only after the old device has been backed up and with sufficient time for completion of a restore operation to factory defaults on the old device to remove user data. The present disclosure enables eliminating the hassle of manual backups, minimizing delays and ensuring a smooth transition to the new device, making the exchange process even more appealing and convenient for users.

In an example, a controller detects that an online shopping order is being made for exchange of a first electronic device as part of a purchase of a second electronic device. In some embodiments, a network device may receive communications from the first electronic device, or another network entity involved in creating and implementing a transaction agreement that includes relinquishment of the first electronic device at the time of delivery of the second electronic device. Consent may be obtained via the first electronic device and communicated to the network device either directly or indirectly for adjusting a device delivery/exchange time based on the amount of time taken to backup data from the first electronic device on or before an established delivery day. Upon receiving user consent, the network device registers device details and metadata about data to be backed up. In response to the network device detecting from a delivery service that the second electronic device is ready for delivery, the network device communicates a backup request to the first electronic device. Upon receiving additional user consent, the first electronic device or the network device estimates the backup time required based on the earlier stored metadata. The network device adjusts the delivery/exchange time to account for the backup time and an additional buffer time providing a margin for other operations such as restoring the first electronic device to default factory settings. The network device informs the user of the first electronic device about the adjusted delivery time. The network device initiates the backup of data from the first electronic device to network storage such as cloud storage. The network device initiates delivery of the second electronic device by the delivery service in response to detecting that the backup is complete on the first electronic device or based on a predetermined/precalculated timing that includes consideration of completion of both the data backup and any factory reset operation, as well as any packaging of the first electronic device. The network device then facilitates the second electronic device restoring the data backup from the cloud storage after delivery and activation of the second electronic device. The network device may further prompt deletion of the backed-up data once restore is complete or alternatively obtaining a subscription for extended archiving of the backup data.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements can be provided with similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1A presents a simplified functional block diagram of an electronic device in which the features of the present disclosure are advantageously implemented to coordinate completion of data backup from a first device with adjusted delivery time of a second device on which the data is later restored. In one or more embodiments, the electronic device includes additional communications functionality that enables electronic device to operate as a network device that communicatively connects with a mobile user device such as first communication device 103a for user 102 in communication environment 101. In the specific example of FIG. 1A, communication environment 101 includes user data backup/restore server 104 with associated network storage 116, delivery server 105, and ecommerce server(s) 106, which are each accessible to first communication device 103a through communication network 107. While shown as separate devices, it is appreciated that in some embodiments, multiple features provided by the various illustrated servers can be integrated into (or provided by) a single server device (or virtual representation thereof). First and second communication devices 103a and 103b may each include communications subsystem 108 that connects via wired or wireless channel 110 to node 112 (e.g., wireless access point, cellular tower) to communicatively connect to network device 100, user data backup/restore server 104, delivery server 105, and ecommerce server(s) 106 via one or more communication network 107.

Network device 100 facilitates exchange of first communication device 103a (i.e., "old" device) for second communication device 103b (i.e., "replacement" or "new" device). In an example, ecommerce server(s) 106 generate purchase agreement 114 for second communication device 103b with a requirement to surrender first communication device 103a at time of delivery of second communication device 103b. User data backup/restore server 104 receives user data 115 from first communication device 103a and stores received user data 115 in network storage 116 for later recovery by second communication device 103b. Delivery processing module 117 of delivery server 105 provides delivery information for delivering second communication device 103b to an address/location of user 102.

Network device 100 may for example be a server. Communication devices 103a and 103b can be one of a host of different types of devices, including but not limited to, a mobile cellular phone, satellite phone, or smart phone, a laptop, a netbook, an ultra-book, a networked smartwatch, or networked sports/exercise watch, and/or a tablet computing device or similar device that can include wireless communication functionality. As a device supporting wireless communication, communication devices 103a and 103b can be utilized as, and also be referred to as, a system, device, subscriber unit, subscriber station, mobile station (MS), mobile, mobile device, remote station, remote terminal, user terminal, terminal, user agent, user device, a session initiation protocol (SIP) phone, a wireless local loop (WLL) station, a personal digital assistant (PDA), computer workstation, a handheld device having wireless connection capability, a computing device, or other processing devices.

In addition to communications subsystem 108 and controller 120, network device 100 may include memory subsystem 122, data storage subsystem 124 and input/output (I/O) subsystem 126. To enable management by controller 120, system interlinks 128 communicatively connects controller 120 with communications subsystem 108, memory subsystem 122, data storage subsystem 124 and I/O subsystem 126. System interlinks 128 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (i.e., system interlink 128) are illustrated in FIG. 1A, it is to be understood that more, fewer, or different interconnections may be present in other embodiments.

Controller 120 includes processor subsystem 130, which includes one or more central processing units (CPUs) or data processors. Processor subsystem 130 can include one or more digital signal processors and graphics processing units (GPUs), etc. that can be integrated with data processor(s). Processor subsystem 130 can include other processors such as auxiliary processor(s) that may act as a low power consumption, always-on sensor hub for physical sensors. Controller 120 manages, and in some instances directly controls, the various functions and/or operations of network device 100. These functions and/or operations include, but are not limited to including, application data processing, communication, navigation tasks, image processing, and signal processing. In one or more alternate embodiments, network device 100 may use hardware component equivalents for application data processing and signal processing. For example, network device 100 may use special purpose hardware, dedicated processors, general purpose computers, microprocessor-based computers, micro-controllers, optical computers, analog computers, dedicated processors and/or dedicated hard-wired logic.

Memory subsystem 122 (or memory 122) stores program code 132 for execution by processor subsystem 130 to provide several of the functionality described herein. Program code 132 includes applications such as device exchange manager 133, user data backup/restore module 134, ecommerce application 135, factory default restoration (FDR) utility 136, and other applications 137. In one or more embodiments, several of the described aspects of the present disclosure are provided via executable program code of applications executed by controller 120. Controller 120 is configured by program code 132 to perform functionality described herein. In an example, device exchange manager 133 provides functionality for interacting with device exchange client 138 of first and second communication devices 103a and 103b. User data backup/restore module 134 provides functionality for performing user data backup and restore interactions with user data backup/restore server 104. Ecommerce application 135 provides functionality for communicating with ecommerce server(s) 106. Factory default restoration (FDR) utility 136 provides functionality for erasing user data 115 from memory subsystem 122. In one or more embodiments, program code 132 may be integrated into a distinct chipset or hardware module as firmware that operates separately from executable program code. Portions of program code 132 may be incorporated into different hardware components that operate in a distributed or collaborative manner. Memory subsystem 122 further includes operating system (OS), firmware interface, such as basic input/output system (BIOS) or Uniform Extensible Firmware Interface (UEFI), and firmware, which also includes and may thus be considered as program code 132.

Program code 132 may access, use, generate, modify, store, or communicate computer data 140, such as user data 115 for network device 100 to use, backup and restore. Computer data 140 may also include identification information 141 associated with first communication device 103a. Computer data 140 may incorporate "data" that originated as raw, real-world "analog" information that consists of basic facts and figures. Computer data 140 includes different forms of data, such as numerical data, images, coding, notes, and financial data. Computer data 140 may originate from network device 100 or be retrieved from a remote device via communications subsystem 108. Network device 100 may store, modify, present, or transmit computer data 140, such as user data 115 and identification information 141. Computer data 140 may be organized in one of a number of different data structures. Common examples of computer data 140 include video, graphics, text, and images. Computer data 140 can also be in other forms of flat files, databases, and other data structures.

Data storage subsystem 124 of network device 100 includes data storage device(s) 148. Controller 120 is communicatively connected, via system interlink 128, to data storage device(s) 148. Data storage subsystem 124 provides program code 132 and computer data 140 stored on non-volatile storage that is accessible by controller 120. For example, data storage subsystem 124 can provide a selection of program code 132 and computer data 140. These applications can be loaded into memory subsystem 122 for execution/processing by controller 120. In one or more embodiments, data storage device(s) 148 can include hard disk drives (HDDs), optical disk drives, and/or solid-state drives (SSDs), etc. Data storage subsystem 124 of network device 100 can include removable storage device(s) (RSD (s)) 150, which is received in RSD interface 152. Controller 120 is communicatively connected to RSD 150, via system interlink 128 and RSD interface 152. In one or more embodiments, RSD 150 is a non-transitory computer program product or computer readable storage device that stores program code and/or instructions that may be executed by a processor associated with an electronic device such as network device 100. Controller 120 can access data storage device(s) 148 or RSD 150 to provision network device 100 with program code 132 and computer data 140.

Figure 1B:
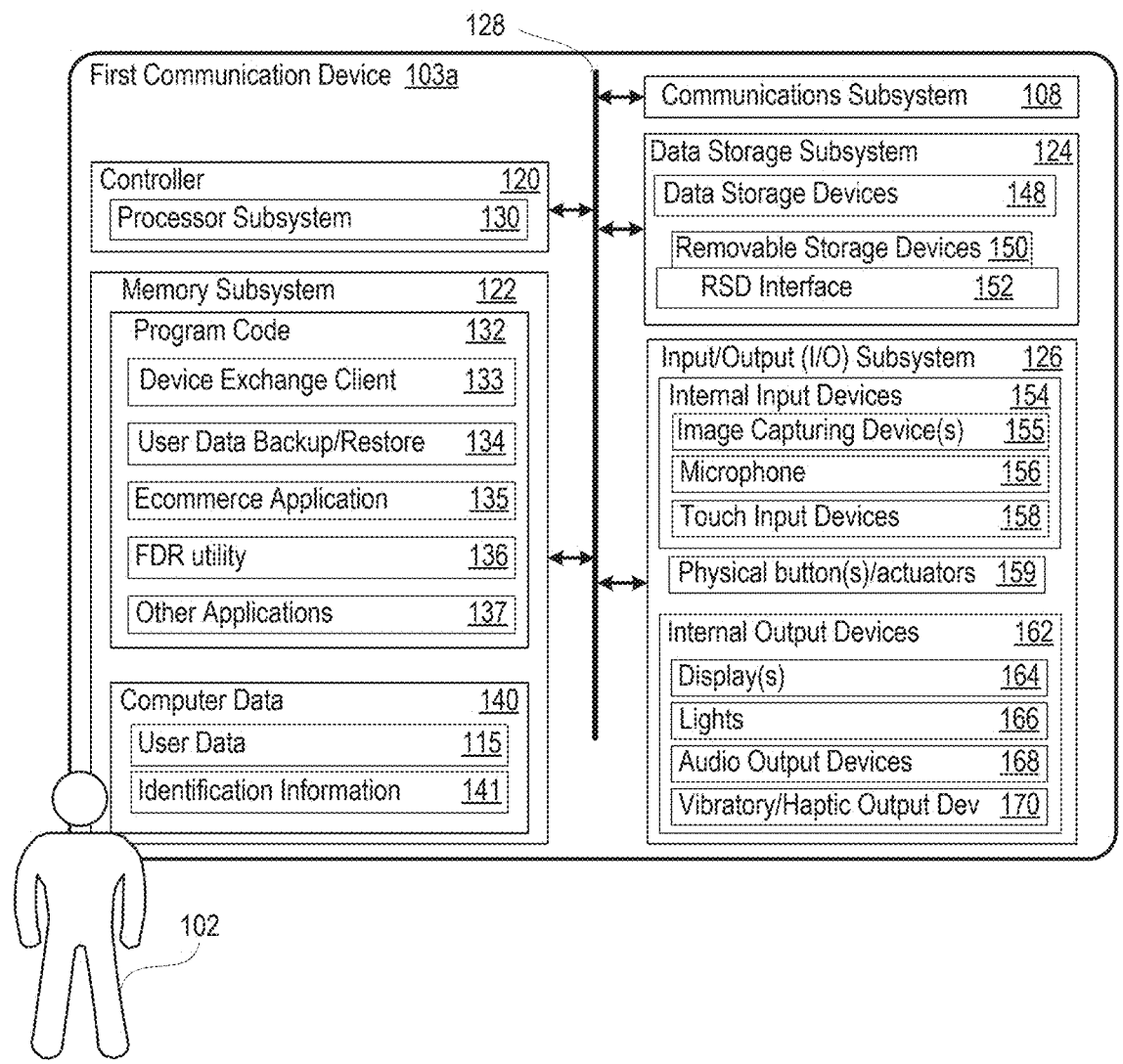
FIG. 1B presents a simplified functional block diagram of a communication device having additional user interface capabilities for interacting with a user, according to one or more embodiments.

FIG. 1B is a functional block diagram of first communication device 103a having additional user interface capabilities for interacting with user 102. Second communication device 103b (FIG. 1) may be similar or identical to first communication device 103a. Communication device 103a may include identical or similar components as described for network device 100 (FIG. 1). In addition, I/O subsystem 126 may include internal input devices 154 such as image capturing device(s) 155, microphone 156, and touch input devices 158 (e.g., screens, keys, or buttons). I/O subsystem 126 may include physical buttons/actuators 159 that can be located on a periphery of the device housing. I/O subsystem 126 may include internal output devices 162 such as display (s) 164, lights 166, audio output devices 168, and vibratory or haptic output devices 170.

In one or more embodiments, controller 120, via communications subsystem 108, performs multiple types of cellular over-the-air (OTA) connections. In one or more embodiments, controller 120, via communications subsystem 108, may communicate via an OTA cellular connection with radio access networks (RANs). In an example, first communication device 103a, via communications subsystem 108, connects via RANs of a terrestrial network that is communicatively connected to a network server. In one or more embodiments, controller 120, via communications subsystem 108, communicates via a wireless local area network (WLAN) link using one or more IEEE 802.11 WLAN protocols with an access point. In one or more embodiments, controller 120, via communications subsystem 108, performs other types of wireless communication, such as by using a Bluetooth connection or other personal access network (PAN) connection. In an example, a user may wear a health monitoring device such as a smartwatch that is communicatively coupled to first communication device 103a via a wireless connection. In one or more embodiments, communications subsystem 108 includes a global positioning system (GPS) module that receives GPS broadcasts from GPS satellites to obtain geospatial location information, which enables first communication device 103a to self-locate, among other features.

According to aspects of the present disclosure, with continuing reference to FIG. 1A, in response to detecting completion of a transactional agreement to have second communication device 103b delivered to and exchanged for first communication device 103a of user 102, controller 120 is configured to cause network device 100 to communicate, via communications subsystem 108, a backup request to first communication device 103a for user data 115 that is currently stored on first communication device 103a. Controller 120 configures network device 100 to receive, from first communication device 103a in response to the backup request, identification information 141 associated with first communication device 103a and metadata associated with user data 115 to be backed up. Controller 120 configures network device 100 to trigger delivery of second communication device 103b and pickup of first communication device 103a at a time corresponding to after completion of the backup of the user data to network storage 116.

In one or more embodiments, controller 120 configures network device 100 to register, using identification information 141, a user account with network storage 116 for receiving backup of user data 115. Alternatively, first communication device 103a registers, using identification information 141, a user account with network storage 116. Controller 120 configures network device 100 to determine a backup time required to complete backup of user data 115 to network storage 116. In an example, first communication device 103a reports data size of user data 115 and upload bandwidth speed available to first communication device 103a. Controller 120 configures network device 100 to determine an adjustment of a delivery schedule of second communication device 103b based on the backup time. Delivery of second communication device 103b occurs only after backup of user data 115. Controller 120 configures network device 100 to communicate the adjustment of the delivery schedule to delivery processing module 117 that controls delivery by a delivery personnel of second communication device 103b and pick up of first communication device 103a.

In one or more particular embodiments, controller 120 configures network device 100 to provide, within the backup request, a prompt for user consent to complete the backup to network storage 116. In response to receiving the user consent communicated by first communication device 103a, controller 120 configures network device 100 to perform the determination of the adjustment of the delivery schedule of communication device 103a. Controller 120 is configured to communicate a backup initiation request to first communication device 103a to trigger activation of the backup at first communication device 103a. Controller 120 is configured to determine a first delivery time window that falls after a maximum time required to complete the backup from the backup activation. Delivery of communication device 103a is scheduled to be completed within the first delivery time window. Controller 120 is configured to communicate to first communication device 103a, the first delivery time window as the adjustment of the delivery schedule. In one or more particular embodiments, controller 120 configures network device 100 to add buffer time to the adjustment of the delivery schedule to accommodate variations in data throughput during backup of the user data and provide additional time to complete a factory reset on first communication device 103a.

In one or more embodiments, in response to determining that backup of the user data is complete and that delivery of communication device 103a is less than a threshold time away, controller 120 configures network device 100 to communicate a prompt to first communication device 103a to delete user data 115 on first communication device 103a and to power down in preparation for exchange. The prompt is or can include transmission of a pre-programmed module (or segment of executable code) providing a user selectable trigger option that initiates deletion of the user data from first communication device 103a and a reset of first communication device 103a back to factory settings.

In one or more embodiments, controller 120 configures network device 100 to schedule pickup of communication device 103a for delivery according to a delivery schedule. In response to determining that the backup of the user data will not be completed within a delivery window corresponding with the delivery schedule, controller 120 configures network device 100 to delay delivery of communication device 103a and reassigning delivery of second communication device 103b to a second delivery time window corresponding to a delayed delivery schedule. Controller 120 configures network device 100 to communicate the second delivery time window corresponding to the delayed delivery schedule to first communication device 103a.

In one or more embodiments, in response to receipt of a confirmation of a completed exchange of first communication device 103a for second communication device 103b, controller 120 configures network device 100 to enable download and restore, by second communication device 103b, of user data 115 from a user account within network storage 116. In one or more particular embodiments, in response to determining completion of download of the user data by second communication device 103b, controller 120 may configure network device 100 to delete user data 115 from the network storage.

In one or more embodiments, in response to determining completion of download of user data by second communication device 103b, controller 120 configures network device 100 to communicate to second communication device 103b, an offer for an archival service for continuing backup of user data 115. Controller 120 configures network device 100 to implement the archival service in response to receiving acceptance from second communication device 103b.

Figure 2:
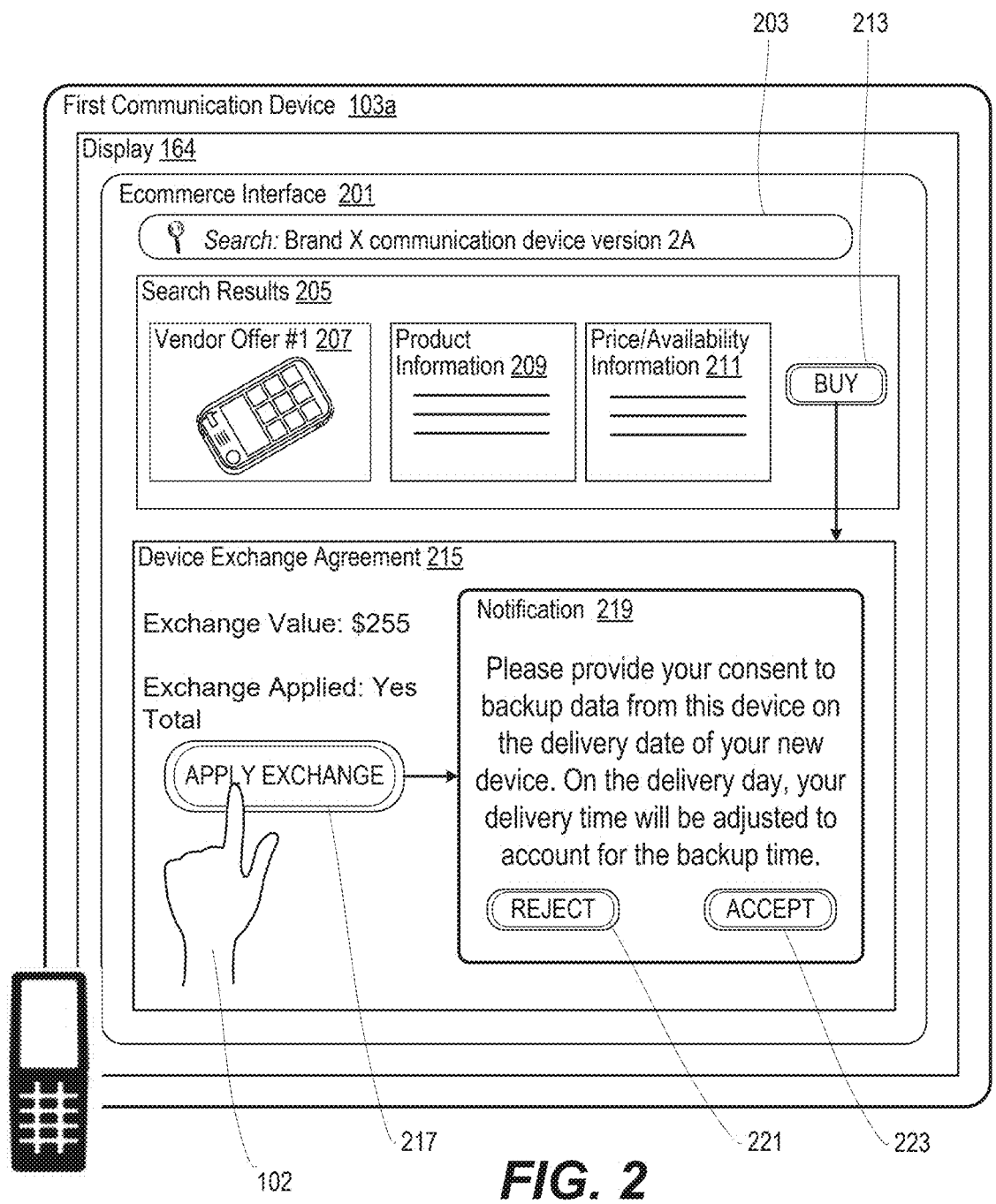
FIG. 2 is a front view of a display of the first device presenting an ecommerce interface window that provides for device exchange purchases, according to one or more embodiments.

FIG. 2 is a front view of display 164 of first communication device 103a presenting ecommerce interface window 201 that provides for device exchange purchases. Ecommerce interface window 201 includes product query field 203 that has been used to search for "Brand X communication device version 2A". Search results 205 includes vendor offer #1 image 207 of second communication device 103b (FIG. 1), product information 209, and price/availability information 211. When buy control 213 is selected by user 102 for the vendor offer #1, device exchange agreement window 215 opens up with terms of exchange for first communication device 103a (FIG. 1). In response to selecting apply exchange control 217, notification window 219 pops up and indicates: "Please provide your consent to backup data from this device the delivery date of your new device. On the delivery day, your delivery time will be adjusted to account for the backup time." Notification window 219 presents reject control 221 and accept control 223 for user selection in response to the notification.

Figure 3:
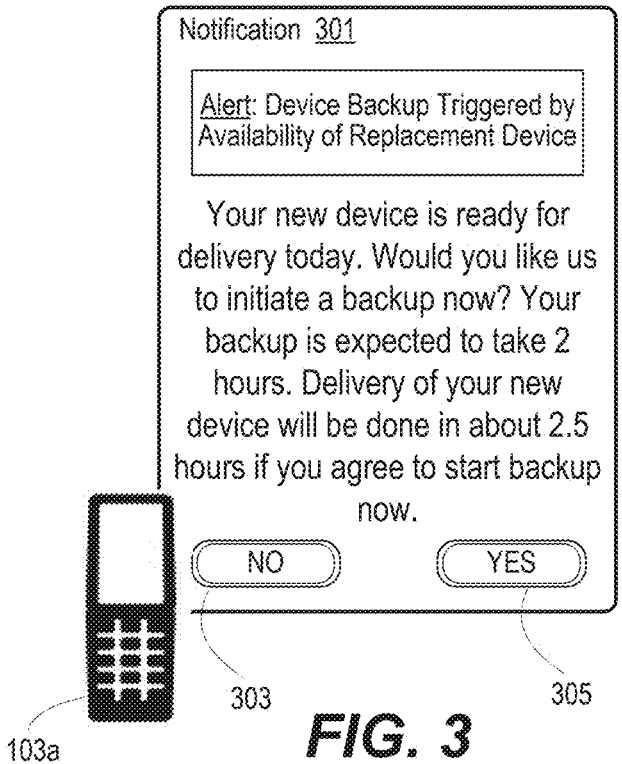
FIG. 3 presents a first notification window during the exchange process presented by the first device for prompting device backup based on availability of delivery of the second device, according to one or more embodiments.

FIG. 3 presents first notification window 301 during the exchange process presented by first communication device 103a (i.e., first device) for prompting device backup based on availability of second communication device 103b (FIG. 1) for delivery. In an example, first notification window 301 indicates "Your new device is ready for delivery today. Would you like us to initiate a backup now? Your backup is expected to take 2 hours. Delivery of your new device will be done in about 2.5 hours if you agree to start backup now." No control 303 and Yes control 305 are presented to respectively decline or to accept implementation of the backup.

Figure 4:
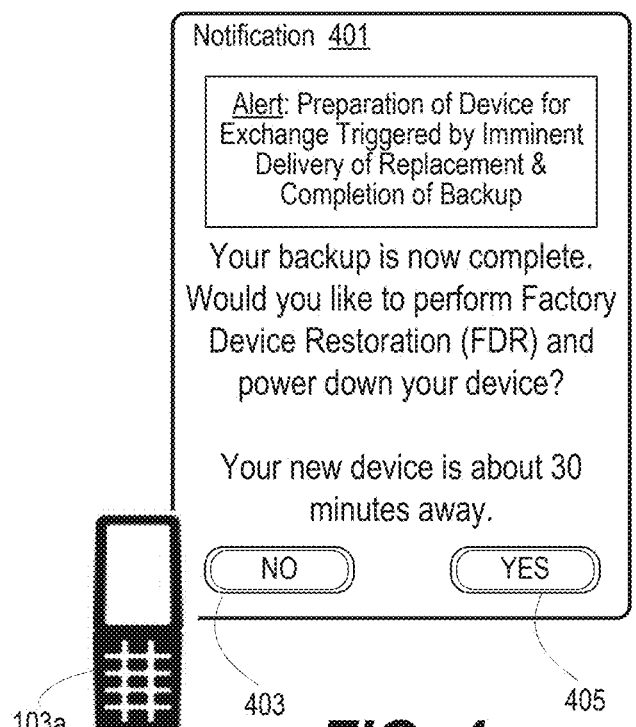
FIG. 4 presents a second notification window during the exchange process presented by the first device for prompting device factory default restoration and power down based on completion of data backup and imminent delivery of the second device, according to one or more embodiments.

FIG. 4 presents second notification window 401 during the exchange process presented by first communication device 103 (i.e., first device) for prompting device factory default restoration and power down based on completion of data backup and imminent delivery of second communication device 103b (FIG. 1). In an example, second notification window 401 indicates: "Your backup is now complete. Would you like to perform Factory Device Restoration (FDR) and power down your device? Your new device is about 30 minutes away." No control 403 and Yes control 405 are presented to respectively decline or to accept implementation of the FDR and then power down.

Figure 5:
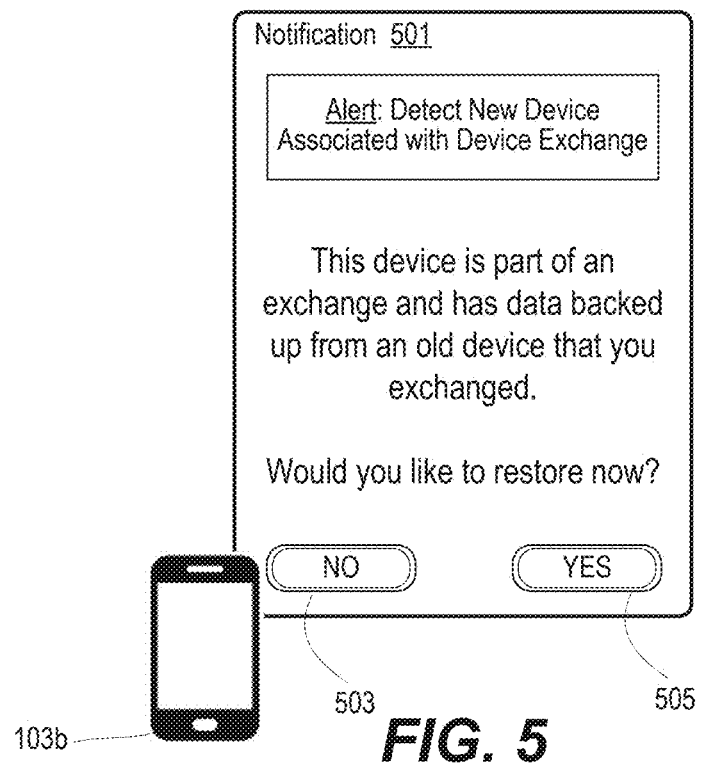
FIG. 5 presents a third notification window during the exchange process presented by the second device for prompting data recovery in response to delivery and activation of the second device, according to one or more embodiments.

FIG. 5 is third notification window 501 during the exchange process presented by second communication device 103b for prompting data recovery in response to delivery and activation of second communication device 103b. In an example, third notification window 501 indicates: "This device is part of an exchange and has data backed up from an old device that you exchanged. Would you like to restore now?" No control 503 and Yes control 505 are presented to respectively decline or to accept implementation of the data restore.

Figure 6:
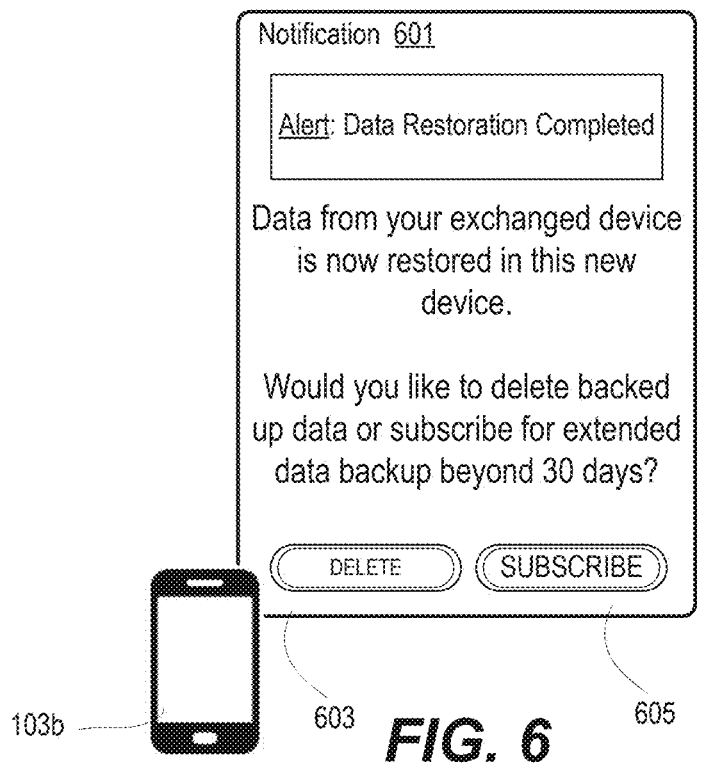
FIG. 6 presents a fourth notification window during the exchange process presented by the second device for prompting either deletion of the backup data or subscribing for extended network storage, according to one or more embodiments.

FIG. 6 is fourth notification window 601 presented by second communication device 103b following completion of the exchange process for prompting either deletion of the backup data in network storage 116 (FIG. 1) or subscribing for extended network storage. In an example, third notification window 601 indicates: "Data from your exchanged device is now restored in this new device. Would you like to delete backed up data or subscribe for extended data backup beyond 30 days?" Delete control 603 and Subscribe control 605 are presented to respectively delete the backup or to subscribe.

Figure 7A:
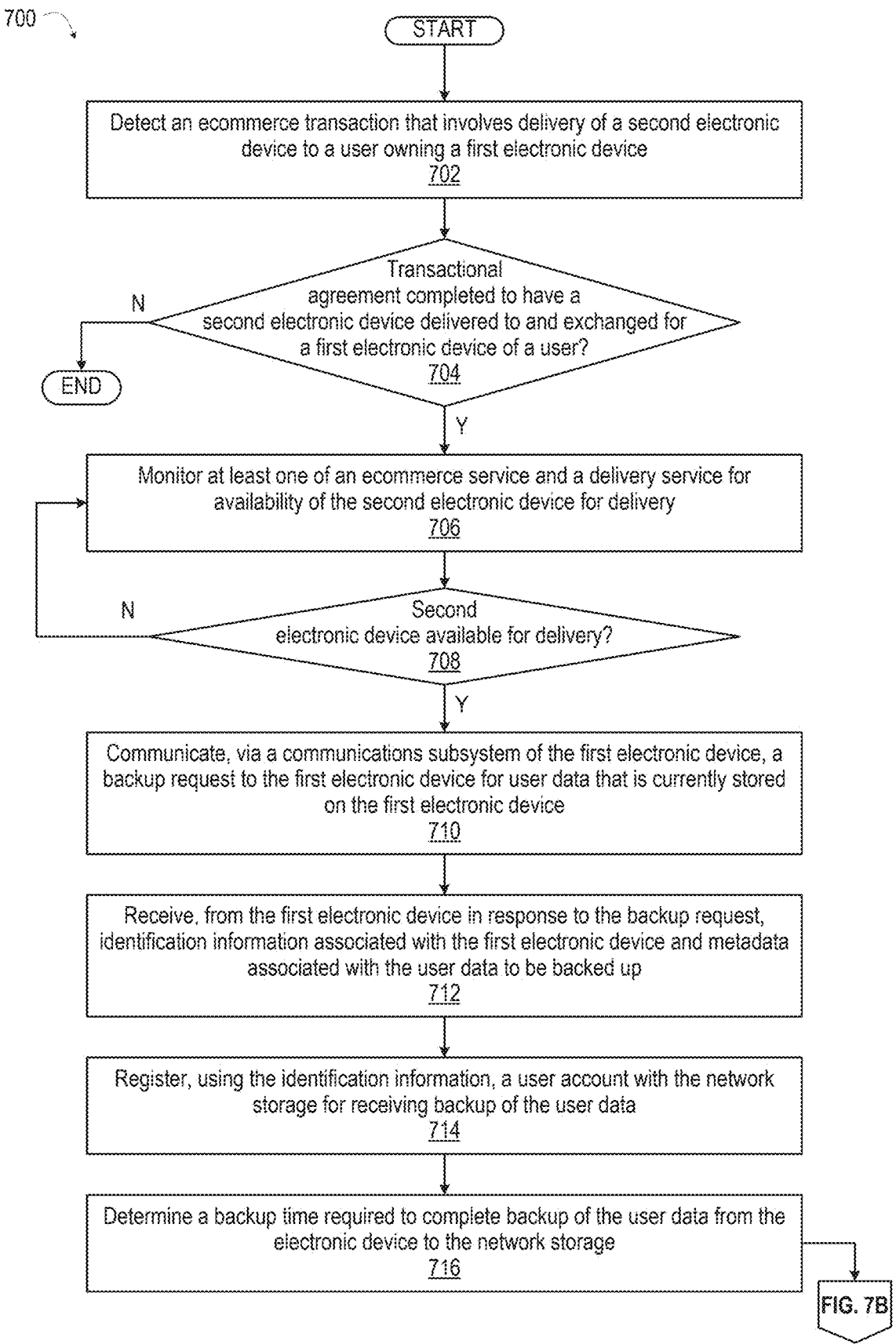
Figure 7C:
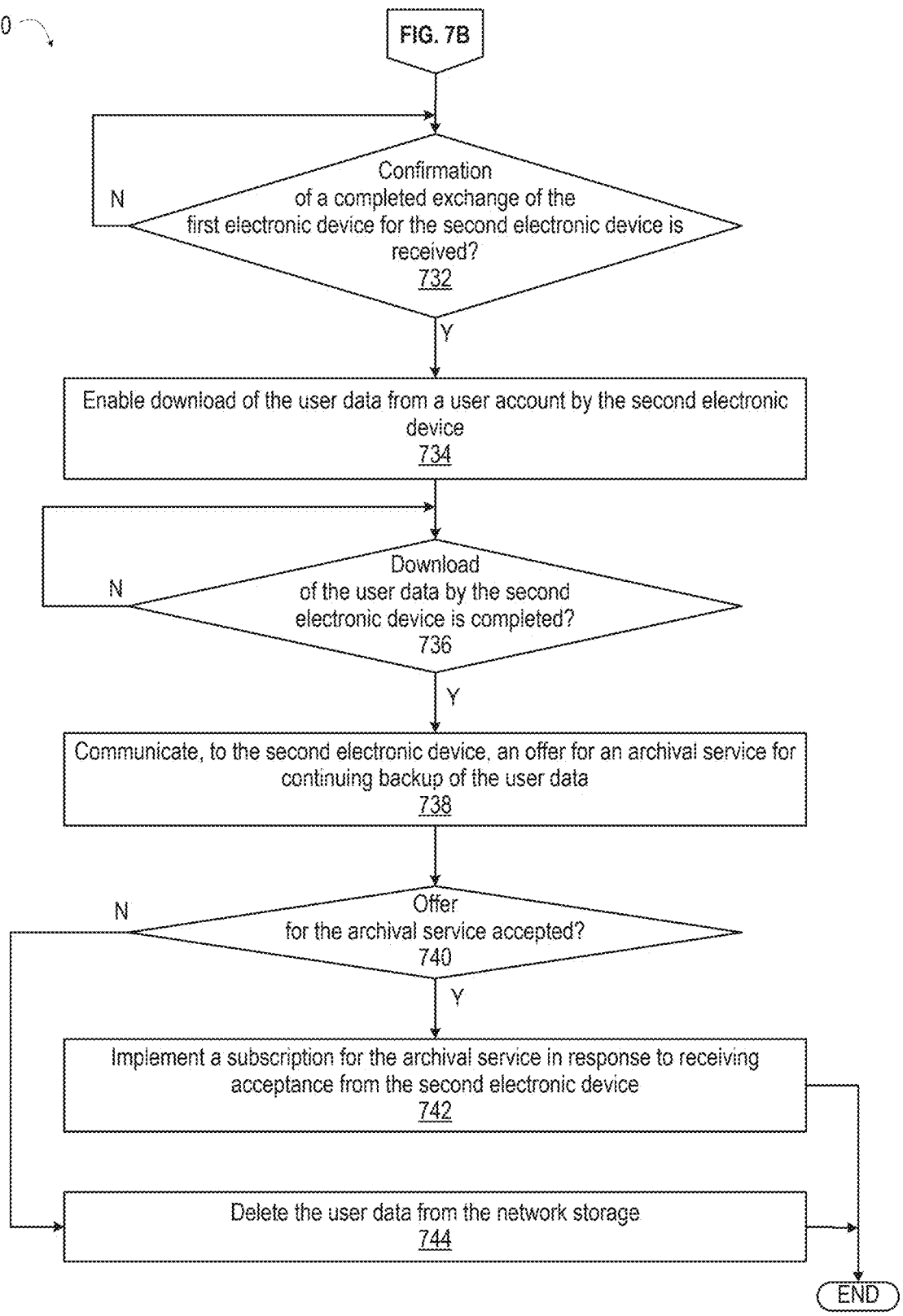
Figure 8:
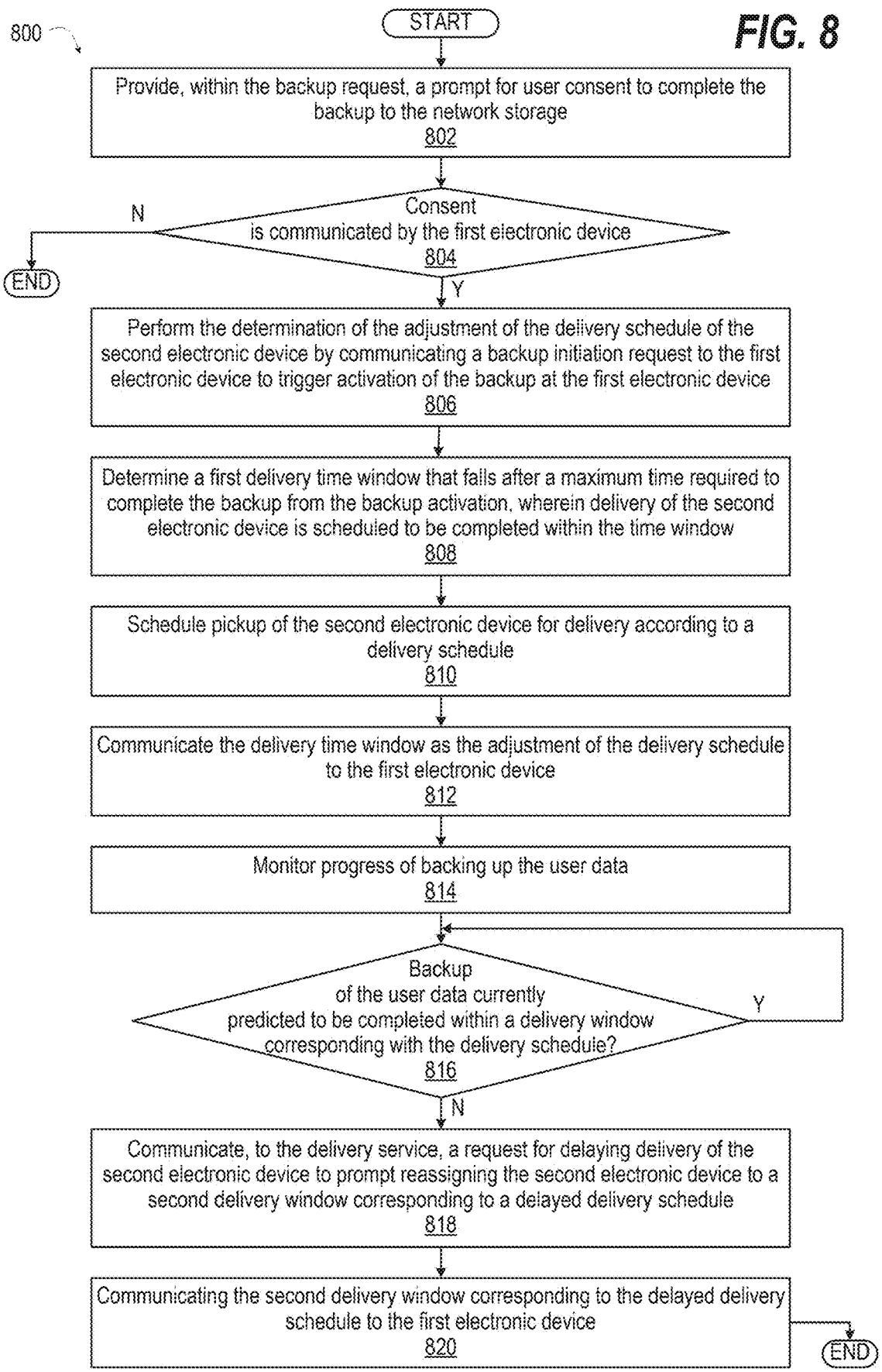
FIG. 8 is a flow diagram presenting a method that may augment the method of FIG. 7 with additional features, including obtaining consent to an adjusted delivery time and supporting additional types of delivery schedule adjustment, according to one or more embodiments.

FIGS. 7A-7C (collectively "FIG. 7") are a flow diagram presenting method 700 for facilitating, by a network device, coordinated data backup with adjusted delivery time for a second device to which the data is restored. FIG. 8 is a flow diagram presenting method 800 that may augment method 700 (FIG. 7) with additional features such as obtaining consent to adjusted delivery time and supporting additional types of delivery schedule adjustment. The description of method 700 (FIG. 7) and method 800 (FIG. 8) are provided with general reference to the specific components illustrated within the preceding FIGS. 1A-1B and 2-6. Specific components referenced in method 700 (FIG. 7) and method 800 (FIG. 8) may be identical or similar to components of the same name used in describing preceding FIGS. 1A-1B and 2-6. In one or more embodiments, controller 120 (FIG. 1) configures a computing device such as network device 100 to provide the described functionality of method 700 (FIG. 7) and method 800 (FIG. 8).

With reference to FIG. 7A, method 700 includes detecting an ecommerce transaction that involves delivery of a second electronic device to a user owning a first electronic device (block 702). Method 700 includes determining whether the ecommerce transaction involves a device-exchange transactional agreement to have the second electronic device delivered to a user as an exchange transaction involving pick-up of the first electronic device of the user (decision block 704). In response to determining that the transaction does not involve a device-exchange transactional agreement, method 700 ends. In response to determining that the transaction does involve a device-exchange transactional agreement to have the second electronic device delivered to and exchanged for the first electronic device of a user, method 700 includes monitoring at least one of an ecommerce service and a delivery service for availability of the second electronic device for delivery (decision block 706). In response to determining that the second electronic device is not available for delivery, method 700 returns to block 706. In response to determining that the second electronic device is available for delivery, method 700 includes communicating, via a communications subsystem of the first electronic device, a backup request to the first electronic device for user data that is currently stored on the first electronic device (block 710). Method 700 includes receiving, from the first electronic device, in response to the backup request, identification information associated with the first electronic device and metadata associated with the user data to be backed up (block 712). Additional scheduling features that augment method 700 are described below for method 800 of FIG. 8. With continuing reference to FIG. 7, method 700 includes registering, using the identification information, a user account with the network storage for receiving backup of the user data (block 714). Method 700 includes determining a backup time required to complete backup of the user data from the first electronic device to the network storage (block 716). In one embodiment, the timing of the activation of the backup process can be based on a calculation of the amount of time required to complete the backup and the length of time to complete the delivery of the second communication device once delivery is initiated. In an alternate/inverse embodiment, the timing of the initiation of the delivery can be triggered by the activation of the back-up by the user. Method 700 proceeds to block 718 (FIG. 7B).

With reference to FIG. 7B, method 700 includes adding buffer time to the adjustment of the delivery schedule to accommodate variations in data throughput during backup of the user data (block 718). Method 700 includes determining an adjustment of a delivery schedule of the second electronic device based on the backup time, where delivery of the second electronic device occurs only after the backup time elapses following a start-time of the backup of the user data (block 720). Method 700 includes communicating the adjustment of the delivery schedule to a delivery processing module that controls delivery by a delivery personnel of the second electronic device and pick up of the first electronic device (block 722). Method 700 includes determining whether backup of the user data is complete to a network storage (decision block 724). In response to determining that the backup of the user data is incomplete, method 700 returns to decision block 724. In response to determining that the backup of the user data is complete, method 700 includes triggering delivery of the second device and pickup of the first electronic device (block 726). Method 700 includes determining whether delivery of the second electronic device is less than a threshold time away (decision block 728). In response to determining that delivery of the second electronic device is not less (i.e., it is equal to or greater) than a threshold time away, method 700 returns to decision block 728. In response to determining that delivery of the second electronic device is less than a threshold time away, method 700 includes communicating a prompt to the first electronic device to delete the user data on the first electronic device and to power down the electronic device in preparation for exchange (block 730). According to one or more embodiment, the prompt can include a user selectable trigger option that initiates deletion of the user data from the first electronic device and initiates a reset of the first electronic device. Method 700 proceeds to block 732 (FIG. 7C).

With reference to FIG. 7C, method 700 includes determining whether a confirmation of a completed exchange of the first electronic device for the second electronic device is received (decision block 732). In response to not receiving confirmation of a completed exchange of the first electronic device for the second electronic device, method 700 returns to block 732. In response to receipt of a confirmation of a completed exchange of the first electronic device for the second electronic device, method 700 includes enabling download of the user data from a user account by the second electronic device (block 734). Method 700 includes determining whether download of the user data by the second electronic device is completed (decision block 736). In response to determining that download of the user data by the second electronic device is incomplete, method 700 returns to block 736. In response to determining download of the user data by the second electronic device is complete, method 700 includes communicating, to the second electronic device, an offer for an archival service for continuing backup of the user data (block 738). Method 700 includes determining whether the offer for the archival service is accepted (decision block 740). In response to determining that the offer for the archival service is accepted (i.e., receiving an accept/yes response from the second electronic device), method 700 includes implementing a subscription for the archival service (block 742). Then method 700 ends. In response to determining that the offer for the archival service is not accepted, method 700 includes deleting the user data from the network storage (block 744). In some embodiments, the deletion of the user data may occur after passage of a preset amount of time (e.g., 30 days) to allow the user time to access the stored data, in the event the user later decides that the archived data is needed. Then, method 700 ends.

With reference to FIG. 8, method 800 includes providing, within the backup request, a prompt for user consent to complete the backup to the network storage (block 802). Method 800 includes determining whether consent is communicated by the first electronic device (decision block 804). In response to not receiving the user consent communicated by the first electronic device, method 800 ends. In response to receiving the user consent communicated by the first electronic device, method 800 includes performing the determination of the adjustment of the delivery schedule of the second electronic device by communicating a backup initiation request to the first electronic device to trigger activation of the backup at the first electronic device (block 806). Method 800 includes determining a first delivery time window that falls after a maximum time required to complete the backup from the backup activation, wherein delivery of the second electronic device is scheduled to be completed within the time window (block 808). Method 800 includes scheduling pickup of the second electronic device for delivery according to a delivery schedule (block 810). Method 800 includes communicating the delivery time window as the adjustment of the delivery schedule to the first electronic device (block 812). Method 800 includes monitoring progress of backing up the user data (block 814). Method 800 includes determining whether the backup of the user data is predicted to be completed within a delivery window corresponding with the delivery schedule (decision block 816). In response to determining that the backup of the user data will not be completed within the delivery window corresponding with the delivery schedule, method 800 includes communicating, to the delivery service, a request for delaying delivery of the second electronic device to prompt reassigning of the second electronic device to a second delivery window corresponding to a delayed delivery schedule (block 818). Method 800 includes communicating the second delivery window corresponding to the delayed delivery schedule to the first electronic device (block 820). Then method 800 ends.

According to aspects of the present disclosure, the network device 100 (FIG. 1), methods 700 (FIG. 7) and 800 (FIG. 8), and computer program product, such as RSD 150 (FIG. 1), facilitate an efficient device-exchange transaction with coordinated data backup from a first device (100) with adjusted delivery time of a second device (103*b*) being exchanged for the first device and to which the data to be is restored. According to aspects of the present disclosure, the network device supports a physical exchange of the old device for the new device, reducing the risk to both the seller and the buyer. In an example, the ecommerce service provides and takes control of the backup/restore process and adjusts the delivery time of the new device. The solution ensures that the new device is sent for delivery only after the old device has been backed up and factory default restored to remove user data. The present disclosure provides for eliminating the hassle of manual backups, making the exchange process even more appealing and convenient for users.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation is not limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. A network device comprising:
    a communications subsystem;
    a memory; and
    a controller communicatively coupled to the communications subsystem and the memory, and which is configured to cause the network device to:
        in response to detecting completion of a transactional agreement to have a second electronic device delivered to and exchanged for a first electronic device of a user:
            communicate, via the communications subsystem, a backup request to the first electronic device for user data that is currently stored on the first electronic device;
            receive, from the first electronic device in response to the backup request, identification information associated with the first electronic device and metadata associated with the user data to be backed up;

trigger delivery of the second electronic device and pickup of the first electronic device at a time corresponding to after completion of the backup of the user data to a network storage; and in response to determining that backup of the user data is complete and that delivery of the second electronic device is less than a threshold time away, communicate a prompt to the first electronic device that initiates deletion of the user data from the first electronic device and resets the first electronic device.

2. The network device of claim 1, wherein the controller is configured to cause the network device to:

register, using the identification information, a user account with the network storage for receiving backup of the user data;

determine a backup time required to complete backup of the user data to the network storage;

determine an adjustment of a delivery schedule of the second electronic device based on the backup time, wherein delivery of the second electronic device occurs only after the backup time from a start of the backup of the user data; and communicate the adjustment of the delivery schedule to a delivery processing module that controls delivery by a delivery personnel of the second electronic device and pick up of the first electronic device.

3. The network device of claim 2, wherein the controller is configured to cause the network device to:

provide, within the backup request, a prompt for user consent to complete the backup to the network storage; and in response to receiving the user consent communicated by the first electronic device:

perform the determination of the adjustment of the delivery schedule of the second electronic device, wherein the controller is configured to:

communicate a backup initiation request to the first electronic device to trigger activation of the backup at the first electronic device; and determine a first delivery time window that falls after a maximum time required to complete the backup from the backup activation, wherein delivery of the second electronic device is scheduled to be completed within the first delivery time window; and communicate, to the first electronic device, the first delivery time window as the adjustment of the delivery schedule.

4. The network device of claim 2, wherein the controller is configured to cause the network device to:

add buffer time to the adjustment of the delivery schedule to accommodate variations in data throughput during backup of the user data.

5. The network device of claim 1, wherein the controller is further configured to cause the network device to:

in response to determining that backup of the user data is complete and that delivery of the second electronic device is less than a threshold time away, communicate the prompt to power down the first electronic device in preparation for exchange.

6. The network device of claim 1, wherein the controller is configured to cause the network device to:

schedule pickup of the second electronic device for delivery according to a delivery schedule; and in response to determining that the backup of the user data will not be completed within a delivery window corresponding with the delivery schedule:

delay delivery of the second electronic device and reassigning the second electronic device to a second delivery time window corresponding to a delayed delivery schedule; and communicate the second delivery time window corresponding to the delayed delivery schedule to the first electronic device.

7. The network device of claim 1, wherein the controller is configured to cause the network device to:

in response to receipt of a confirmation of a completed exchange of the first electronic device for the second electronic device, enable download, by the second electronic device of the user data from a user account within the network storage.

8. The network device of claim 7, wherein the controller is configured to cause the network device to:

in response to determining completion of download of the user data by the second electronic device, delete the user data from the network storage.

9. The network device of claim 1, wherein the controller is configured to cause the network device to:

in response to determining completion of download of the user data by the second electronic device:

communicate, to the second electronic device, an offer for an archival service for continuing backup of the user data; and implement the archival service in response to receiving acceptance from the second electronic device.

10. A method comprising:

in response to detecting, by a network device, completion of a transactional agreement to have a second electronic device delivered to and exchanged for a first electronic device of a user:

communicating, via a communications subsystem of the network device, a backup request to the first electronic device for user data that is currently stored on the first electronic device;

receiving, from the first electronic device in response to the backup request, identification information associated with the first electronic device and metadata associated with the user data to be backed up;

triggering delivery of the second electronic device and pickup of the first electronic device at a time corresponding to after completion of the backup of the user data to a network storage; and in response to determining that backup of the user data is complete and that delivery of the second electronic device is less than a threshold time away, communicating a prompt to the first electronic device that initiates deletion of the user data on the first electronic device and powers down the first electronic device in preparation for exchange.

11. The method of claim 10, further comprising:

registering, using the identification information, a user account with the network storage for receiving backup of the user data;

determining a backup time required to complete backup of the user data to the network storage;

determining an adjustment of a delivery schedule of the second electronic device based on the backup time, wherein delivery of the second electronic device occurs only after the backup time from a start of the backup of the user data; and communicating the adjustment of the delivery schedule to a delivery processing module that controls delivery by a delivery personnel of the second electronic device and pick up of the first electronic device.

12. The method of claim 11, further comprising:
providing, within the backup request, a prompt for user consent to complete the backup to the network storage; and
in response to receiving the user consent communicated by the first electronic device:
  performing the determination of the adjustment of the delivery schedule of the second electronic device, wherein the controller is configured to:
  communicating a backup initiation request to the first electronic device to trigger activation of the backup at the first electronic device;
  determining a first delivery time window that falls after a maximum time required to complete the backup from the backup activation, wherein delivery of the second electronic device is scheduled to be completed within the time window; and
  communicating the delivery time window as the adjustment of the delivery schedule to the first electronic device.

13. The method of claim 11, further comprising:
adding buffer time to the adjustment of the delivery schedule to accommodate variations in data throughput during backup of the user data.

14. The method of claim 10, wherein communicating the prompt comprises communicating the prompt to the first electronic device to initiate a reset of the first electronic device.

15. The method of claim 10, further comprising:
scheduling pickup of the second electronic device for delivery according to a delivery schedule; and
in response to determining that the backup of the user data will not be completed within a delivery window corresponding with the delivery schedule:
  delaying delivery of the second electronic device and reassigning the second electronic device to a second delivery window corresponding to a delayed delivery schedule; and
  communicating the second delivery window corresponding to the delayed delivery schedule to the first electronic device.

16. The method of claim 10, further comprising:
in response to receipt of a confirmation of a completed exchange of the first electronic device for the second electronic device, enabling download of the user data from a user account by the second electronic device.

17. The method of claim 16, further comprising:
in response to determining completion of download of the user data by the second electronic device, deleting the user data from the network storage.

18. The method of claim 10, further comprising:
in response to determining completion of download of the user data by the second electronic device:
  communicating, to the second electronic device, an offer for an archival service for continuing backup of the user data; and
  implementing the archival service in response to receiving acceptance from the second electronic device.

19. A computer program product comprising:
a non-transitory computer readable storage device; and
program code on the computer readable storage device that when executed by a processor associated with a network device, the program code configures the network device to provide functionality of:
  in response to detecting completion of a transactional agreement to have a second electronic device delivered to and exchanged for a first electronic device of a user:
    communicating, via a communications subsystem of the network device, a backup request to the first electronic device for user data that is currently stored on the first electronic device;
    receiving, from the first electronic device in response to the backup request, identification information associated with the first electronic device and metadata associated with the user data to be backed up;
    triggering delivery of the second electronic device and pickup of the first electronic device at a time corresponding to after completion of the backup of the user data to a network storage and register, in network storage; and
    in response to determining that backup of the user data is complete and that delivery of the second electronic device is less than a threshold time away, communicating a prompt to the first electronic device that triggers deletion of the user data on the first electronic device and initiates at least one of a power down of the first electronic device and a reset of the first electronic device in preparation for exchange.

20. The computer program product of claim 19, wherein the program code configures the network device to provide functionality of:
registering, using the identification information, a user account with the network storage for receiving backup of the user data;
determining a backup time required to complete backup of the user data to the network storage;
determining an adjustment of a delivery schedule of the second electronic device based on the backup time, wherein delivery of the second electronic device occurs only after the backup time from a start of the backup of the user data; and
communicating the adjustment of the delivery schedule to a delivery processing module that controls delivery by a delivery personnel of the second electronic device and pick up of the first electronic device.

* * * * *